(12) United States Patent
Miller

(10) Patent No.: US 7,287,779 B2
(45) Date of Patent: Oct. 30, 2007

(54) GOLF/UTILITY CART EXTENSION FOR EXTRA SEATING

(76) Inventor: Steven Miller, 19873 Highway 22 West, Mexico, MO (US) 65265

( * ) Notice: Subject to any disclaimer, the term of this patent is extended or adjusted under 35 U.S.C. 154(b) by 382 days.

(21) Appl. No.: 10/986,202

(22) Filed: Nov. 12, 2004

(65) Prior Publication Data

US 2006/0103126 A1    May 18, 2006

(51) Int. Cl.
    B62D 21/00    (2006.01)
    B62D 23/00    (2006.01)
(52) U.S. Cl. .................................. 280/781; 296/26.08
(58) Field of Classification Search ................ 280/781, 280/785; 180/311; 296/26.08, 64
    See application file for complete search history.

(56) References Cited

U.S. PATENT DOCUMENTS

| | | | | |
|---|---|---|---|---|
| 2,540,859 A | * | 2/1951 | Birkin | 180/11 |
| 2,556,101 A | * | 6/1951 | Negin et al. | 296/26.08 |
| D181,224 S | | 10/1957 | Musgrave | |
| 3,189,363 A | * | 6/1965 | Pierrat | 280/35 |
| 3,554,310 A | | 1/1971 | Dieffenbach | |
| 4,417,523 A | * | 11/1983 | Mariol | 105/1.5 |
| 4,798,509 A | * | 1/1989 | Bubik | 414/563 |
| 4,848,831 A | * | 7/1989 | Buday | 296/165 |
| 4,887,859 A | * | 12/1989 | Aper | 296/26.08 |
| D421,411 S | | 3/2000 | Molzon et al. | |
| 6,131,980 A | * | 10/2000 | Sankrithi | 296/26.11 |
| 6,293,610 B1 | | 9/2001 | Howard | |
| 6,390,537 B1 | * | 5/2002 | DiGonis | 296/181.1 |
| 6,450,522 B1 | * | 9/2002 | Yamada et al. | 280/414.5 |
| 6,474,714 B1 | * | 11/2002 | Stettner | 296/26.08 |
| 6,883,860 B1 | * | 4/2005 | Budge | 296/190.08 |
| 6,905,159 B1 | * | 6/2005 | Saito et al. | 296/65.01 |

FOREIGN PATENT DOCUMENTS

| | | |
|---|---|---|
| JP | 2000-51419 | 2/2000 |
| JP | 2002-17923 | 1/2002 |
| JP | 2002-320695 | 11/2002 |

* cited by examiner

*Primary Examiner*—Paul N. Dickson
*Assistant Examiner*—Joselynn Y. Sliteris
(74) *Attorney, Agent, or Firm*—Richard C. Litman

(57) ABSTRACT

A kit that permits the conversion of a standard two-seat cart into a four-seat cart, with all passengers facing forward. The kit comprises an extension body member having two seats mounted thereon. An extension frame structure includes a pair of horizontally-extending, parallel beams, which frame structure and beams are mounted to the bottom surface of the extension body member. The beams are spaced apart a predetermined distance so that they can respectively abut the frame of a standard two-seat cart. The body portion is designed with wheel wells to accommodate the rear wheels of the cart.

4 Claims, 3 Drawing Sheets

GOLF/UTILITY CART EXTENSION FOR EXTRA SEATING

BACKGROUND OF THE INVENTION

1. Field of the Invention

The present invention generally relates to recreational accessories. More specifically, the present invention is drawn to a kit for converting a two-seat golf or utility cart to a four-seat golf or utility or cart.

2. Description of the Related Art

The golf/utility cart has become a staple at both private and public golf courses. Aside from providing mechanized transportation for golfers (elderly and disabled) who might find it difficult to walk eighteen holes, the cart also provides a means for shortening the time golfers spend on the course. The latter factor is especially important on weekends and holidays when the course is likely to be crowded. At such times a golf cart may be mandatory.

Although there are four-seat carts known in the related art (see accompanying IDS), two-seaters comprise the bulk of the golf cart fleet. Some two-seaters can accommodate four passengers, providing that two passengers ride in an uncomfortable rearward-facing position. Since a foursome is usually required on crowded days, a cart that would comfortably seat four in a forward facing position would certainly ease congestion on the course. Unfortunately, the cost of replacing a fleet of two-seat carts with a fleet of four-seat carts would entail a large capital expenditure. To provide a kit that would permit the relatively inexpensive conversion of a standard two-seater to a comfortable four-seater would surely be a welcome addition to the art.

SUMMARY OF THE INVENTION

The present invention is a kit that permits the conversion of a standard two-seat cart into a four-seat cart, with all passengers facing forward. The kit comprises an extension body member having two seats mounted thereon. An extension frame structure includes a pair of horizontally-extending, parallel beams, which frame structure and beams are mounted to the bottom surface of the extension body member. The beams are spaced apart a predetermined distance so that they can respectively abut the frame of a standard two-seat cart. The body portion is designed with wheel wells to accommodate the rear wheels of the cart.

To accomplish the conversion, the rear body of a two-seat cart is removed and the rear axle is unbolted from the frame. The two beams of the extension body member are positioned in abutment with the frame of the two-seat cart and bolted to the frame. The rear axle is moved so that the wheels are aligned with the wheel wells of the extension body and the axle is bolted to the extension frame structure. The entire conversion can be accomplished in approximately four to six hours.

Accordingly, the instant invention presents a kit containing all parts necessary to convert a standard two-seat cart to an extended four-seat cart, with all seats facing forward.

The invention provides for improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
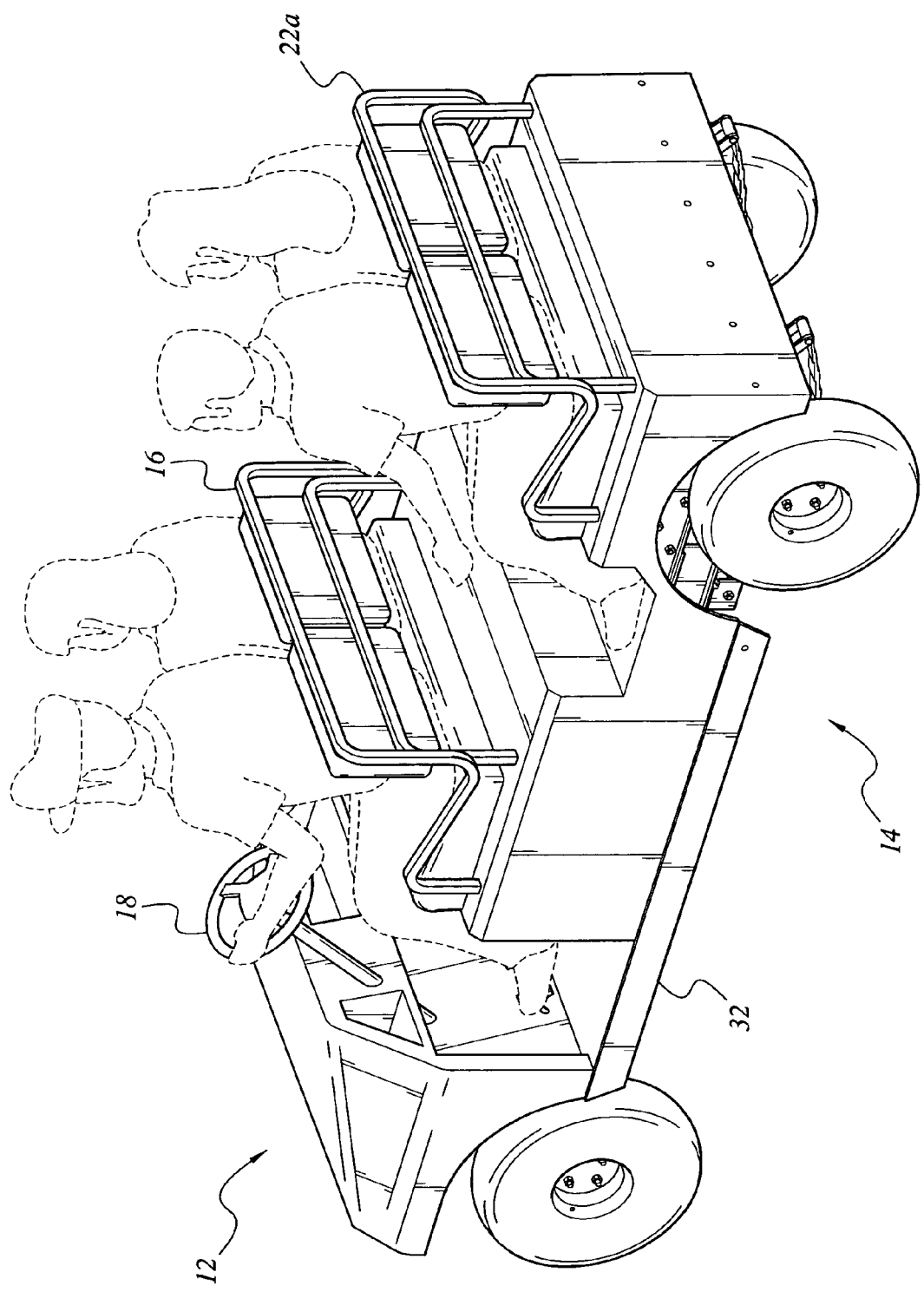
FIG. 1 is an environmental, perspective view of an extended, four-seat cart according to the present invention.

A four-seat golf/utility cart incorporating the present invention is generally illustrated in FIG. 1. The cart includes a front portion 12 and a rear extension 14. Front portion 12 is the front of a standard two-seat cart and includes two front seats 16 and steering column 18. The front portion of the cart is not, per se, part of the inventive concept. The rear portion 14 of the cart is added to the front portion 12 to convert the original two-seat cart into a four-seat cart with all seating facing forward. As contemplated, rear portion 14 is available as a kit.

Figure 2:
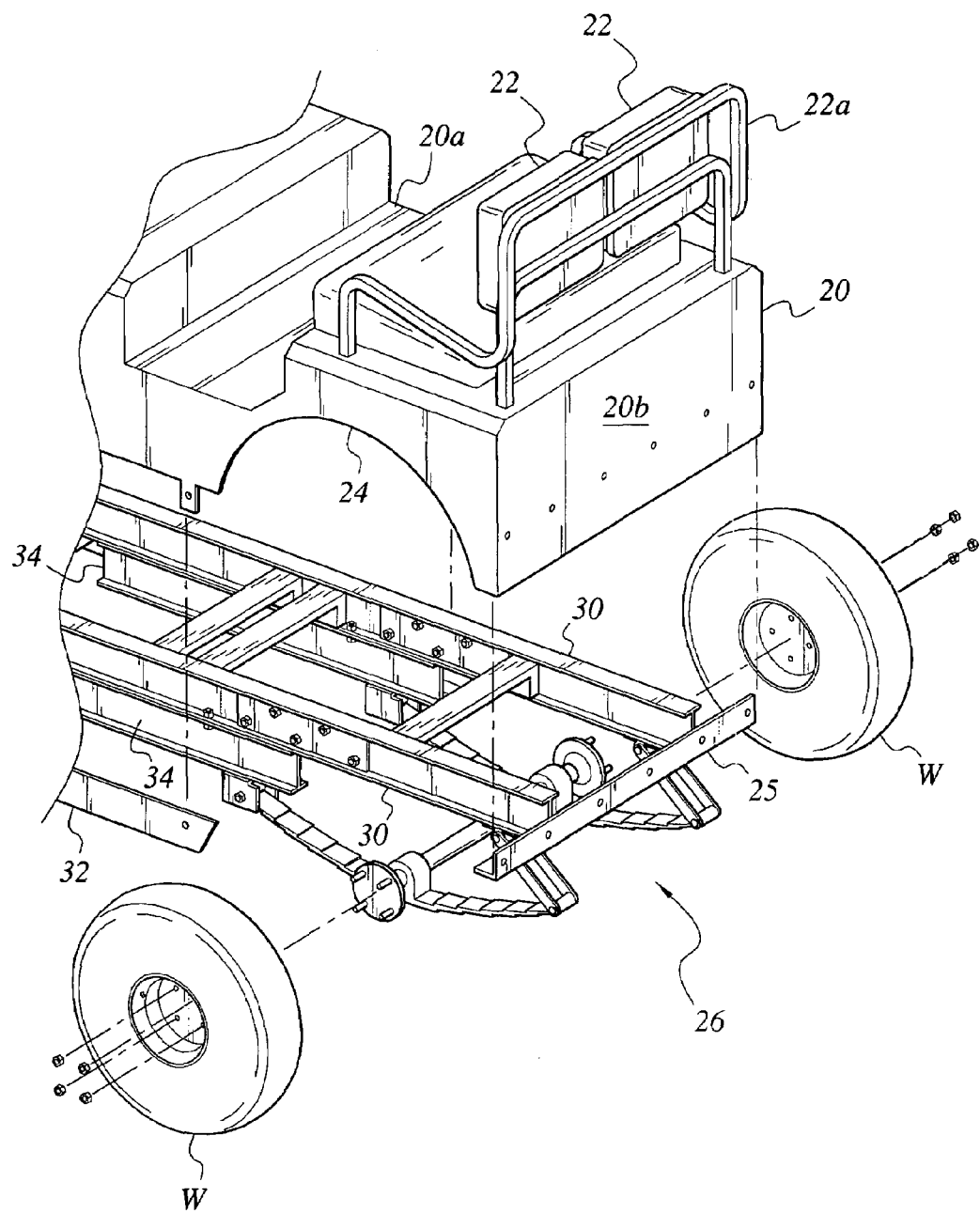
FIG. 2 is an exploded view of an extended, four-seat cart kit according to the present invention.
Figure 3:
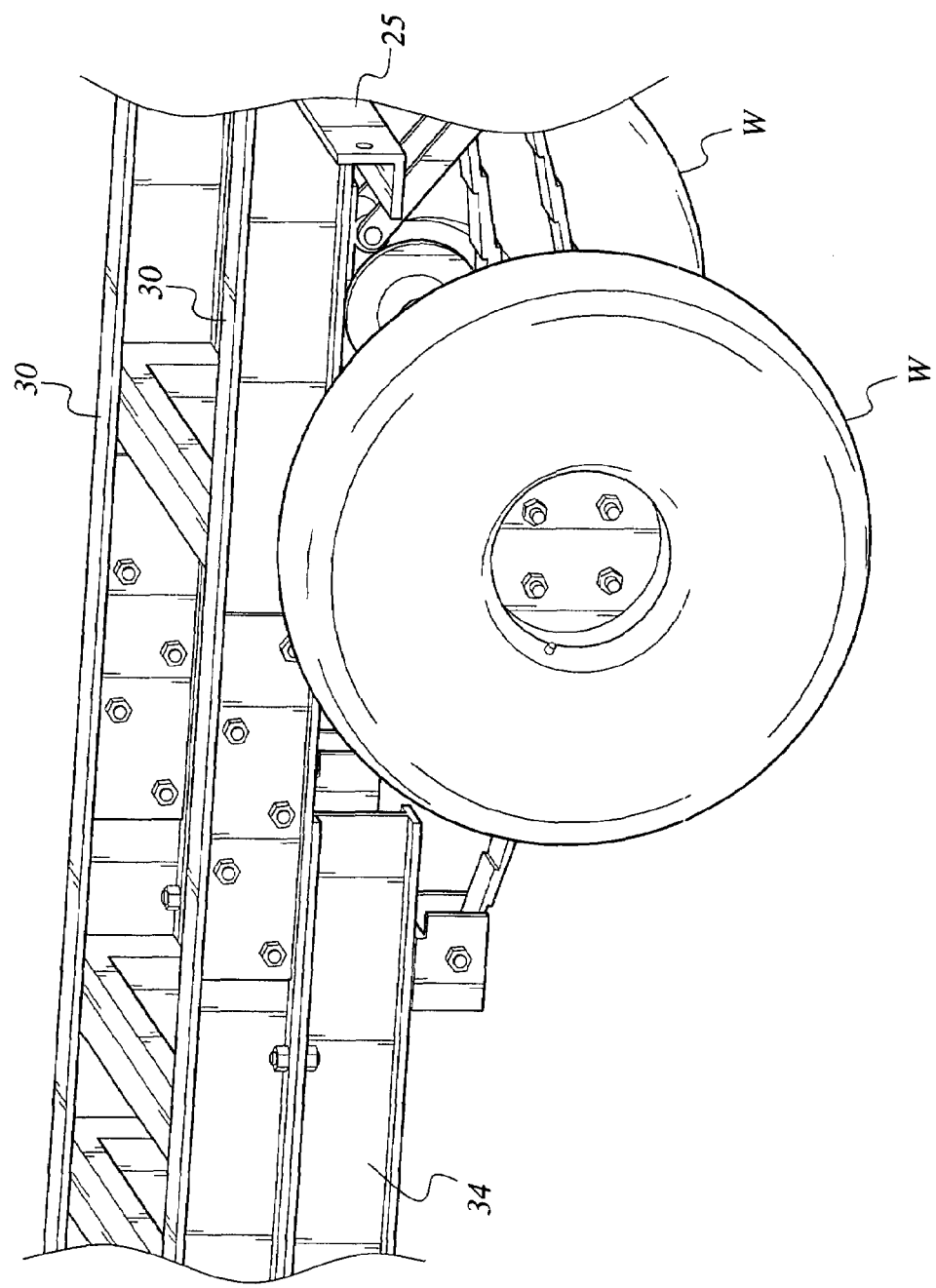
FIG. 3 is a partial view of an extended, four-seat cart kit according to the present invention.

Attention is now directed to FIGS. 2 and 3 wherein the structural makeup of rear portion 14 is more clearly shown. Rear portion 14 comprises an extension body member 20 having a front end 20a and a rear end 20b. Body member 20 is fabricated from a suitable material (plastic or metal) to aesthetically match the material of front portion 12. A pair of seats 22 having support structure 22a therefore is mounted to the upper surfaces of body member 20. Body member 20 is fashioned with a pair of wheel wells 24 (only one is shown) to accommodate wheels W. An extended frame structure 26 is attached to the bottom surface of body member 20. An L-bar 25 is utilized to accomplish the attachment. Extension frame structure 26 includes two parallel beams 30. Beams 30 are spaced apart a pre-determined distance substantially equal to the spacing of frame members 34 in a standard two-seat cart. As explained above, beams 30 are bolted to frame members 34 to convert the cart. Trim members 32 (only one shown) are attached to each side of the converted cart for aesthetic reasons.

It is to be understood that the present invention is not limited to the embodiment described above, but encompasses any and all embodiments within the scope of the following claims.

I claim:

1. A kit for extending a two-seat cart having front and rear wheels to provide extra seating, said kit comprising:

an extension body member, said body member having a front end, a rear end, a top surface and a bottom surface, wherein said body includes a pair of wheel wells located directly above said rear wheels;

a seat support structure, said seat support structure attached to said top surface of said body member; and an extension frame structure, said extension frame structure attached to said lower surface of said body member, wherein said extension frame structure includes a pair of spaced apart parallel beams supported at their rear ends by an L-shaped support bar, said L-shaped support bar further supporting said extension body member.

2. A kit for extending a two-seat cart to provide extra seating as recited in claim 1, wherein a pair of seats is supported on said seat support structure.

3. A kit for extending a two-seat cart to provide extra seating as recited in claim 2, wherein said pair of seats face toward the front end of said body member.

4. A kit for extending a two-seat cart to provide extra seating as recited in claim 1, including a pair of body trim members disposed on an exterior surface of said body member.

* * * * *